Sept. 27, 1966  A. STRAZDINS  3,275,042
LIQUID DISPENSING APPARATUS
Filed Sept. 17, 1964  4 Sheets-Sheet 1
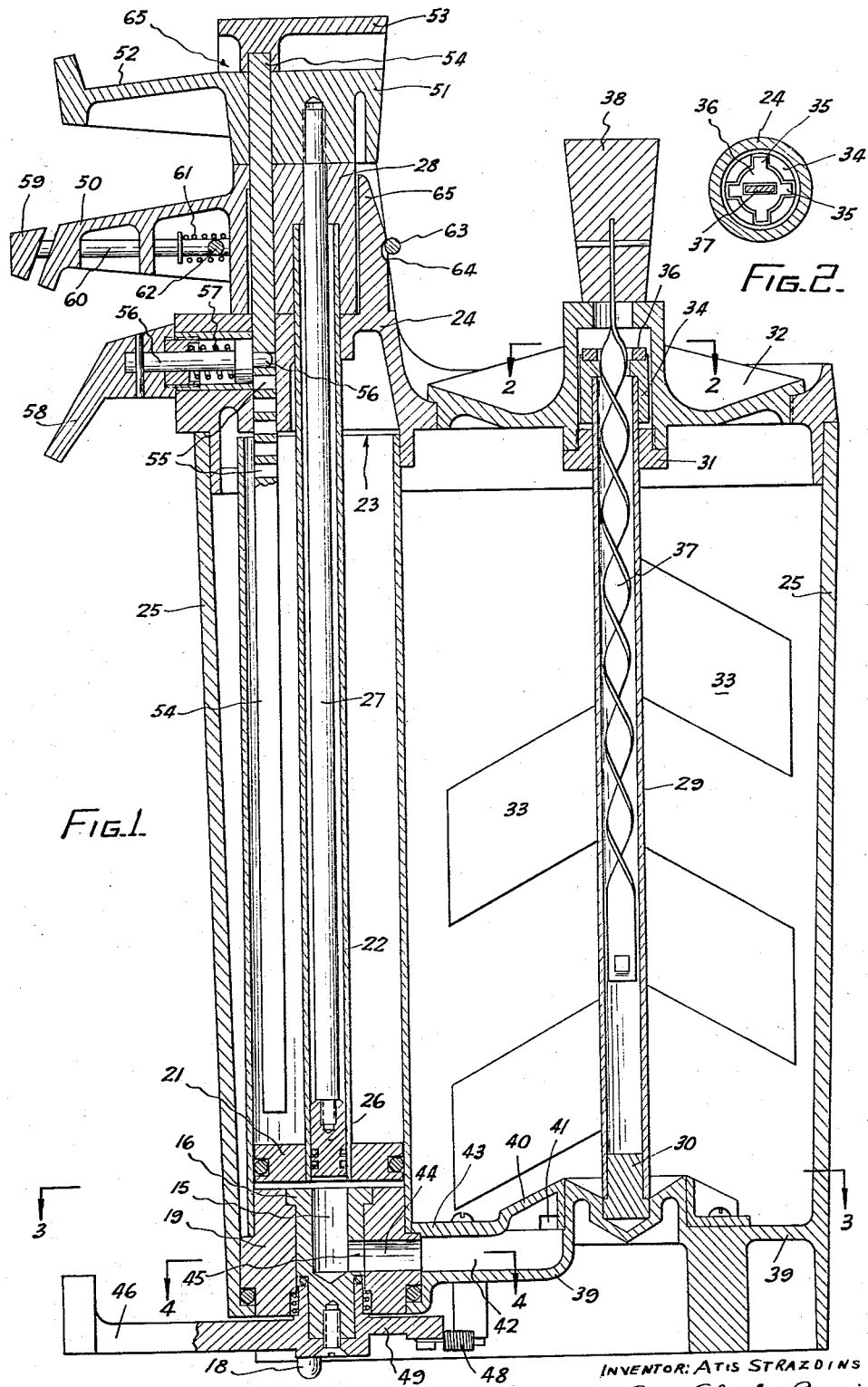
INVENTOR: ATIS STRAZDINS
ATTORNEYS: Browne, Schuyler & Beveridge

INVENTOR:
ATIS STRAZDINS
ATTORNEYS

Sept. 27, 1966 A. STRAZDINS 3,275,042
LIQUID DISPENSING APPARATUS
Filed Sept. 17, 1964 4 Sheets-Sheet 4

INVENTOR:
ATIS STRAZDINS
ATTORNEYS

United States Patent Office 3,275,042
Patented Sept. 27, 1966

3,275,042
LIQUID DISPENSING APPARATUS
Atis Strazdins, 16 Dumfries Ave., Mount Ousley,
Wollongong, New South Wales, Australia
Filed Sept. 17, 1964, Ser. No. 397,261
12 Claims. (Cl. 141—27)

This invention relates to apparatus for dispensing liquids in accurately measured quantities; the present application being a continuation in part of my prior application Serial No. 221,483 filed September 5, 1962, now abandoned.

The invention is applicable in a general way to the dispensing of many different kinds of liquids, but is primarily intended for use in measuring quantities of differently colored paints for the purpose of color-blending to achieve or repeat a required shade or tint; and while not restricted thereto, the invention will be described herein mainly in terms of that specific purpose.

It will be well known that in the color blending of paint, it is frequently necessary for some ingredients to be included in proportions which are very small by comparison with the total liquid mass, and that the smaller the proportion the more critical it becomes for the ingredient to be measured accurately. Hitherto, with the dispensing apparatus available, a margin of error of as much as 8% has been generally regarded, not as satisfactory, but as about the best that can be expected under factory or like practical conditions, as distinct from laboratory conditions under which extreme accuracy is readily obtainable, but not in a manner or with apparatus applicable to the large scale commercial production or the retail vending of a wide range of differently colored paints.

The main object of this invention is to provide liquid dispensing apparatus which while simple, inexpensive and well suited to the measuring out of liquids on a commercial scale, enables such dispensing to be carried out with much greater accuracy; that is, with a margin of error which need be no greater than about 2%.

A further object of the invention is to provide a liquid dispensing apparatus comprising a main or large diameter measuring cylinder and piston arrangement whereby relatively large volumes of liquid may be dispensed, a fractional or small diameter measuring cylinder with a fractional piston in it for dispensing relatively small volumes of the liquid, and index means whereby gauging limits may be set for both said pistons.

In one embodiment of the invention a single index rod is provided in relation to both pistons. Such an arrangement is satisfactory for many dispensing needs, but is not fully convenient except for those dispensing operations involving use of the fractional piston by itself or use of both pistons as though they constituted a single one-piece piston.

Another embodiment of the invention takes care of those dispensing operations for which the embodiment referred to just above is not wholly suited, by providing index rod means for each of the pistons so that each piston may have a gauging limit set for it independently of that set for the other piston, so enabling dispensation, in a single operation, of a required liquid volume composed of a main cylinder volume plus a fractional cylinder volume.

Preferred embodiments of the invention are illustrated in the drawings herewith.

FIG. 1 is a sectional side elevation of a dispenser unit suitable for measuring quantities of paint. In practice it would be desirable to provide a plurality of these units, one for each color or ingredient.

FIGS. 2 to 4 are sectional plans respectively taken on lines 2—2, 3—3 and 4—4 in FIG. 1.

Figure 7:
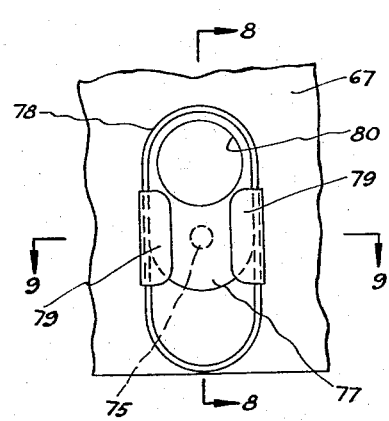
FIG. 7 is a front elevation showing part of a liquid container including valve devices with which the measuring cylinder shown in FIG. 6 is co-operable.
Figure 8:
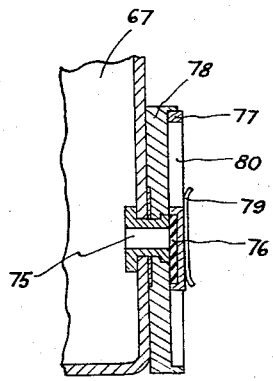
Figure 9:
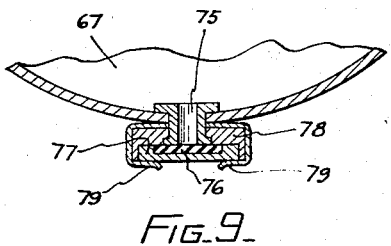

FIGS. 8 and 9 are fragmentary sectional views respectively taken on lines 8—8 and 9—9 in FIG. 7

Referring to FIGS. 1 to 5 a measuring cylinder 14 has an outlet at one end, constituted by a blind-ended bore 15 in a rotary valve plug 16, and a branch duct 17 which leads to an outlet nozzle 18. The plug 16 is rotatable within a cap 19 fixed in the lower end of the cylinder 14 as a closure therefor. The duct 17 is formed in the cap body and the nozzle 18 is preferably screwed or otherwise removably secured to that body so that it may be easily replaced by a similar nozzle having a differently sized outlet hole 20. The size of this hole is preferably such that having regard to the fluidity of the liquid being dispensed, that liquid will not drip from or flow through the hole unless under a pressure somewhat above atmospheric pressure.

The main piston 21, within the cylinder 14, is fixed on the lower end of an open-ended tubular piston rod 22. This piston rod extends through and beyond the upper end 23 of cylinder 14 and is guided for endwise movement by being slidable in a bearing hole provided in a cover 24 within which the cylinder 14 is mounted by way of its cap 19.

The piston rod 22 serves as a cylinder for the fractional piston 26. This piston is mounted on one end of a fractional piston rod 27 whereof the upper end extends through and beyond the upper end of the tubular piston rod 22 and is guided for endwise movement by being slidable in a bearing hole in a boss 28 (referred to later herein) within which the upper end of the tubular piston rod 22 is fixed.

Figure 4:
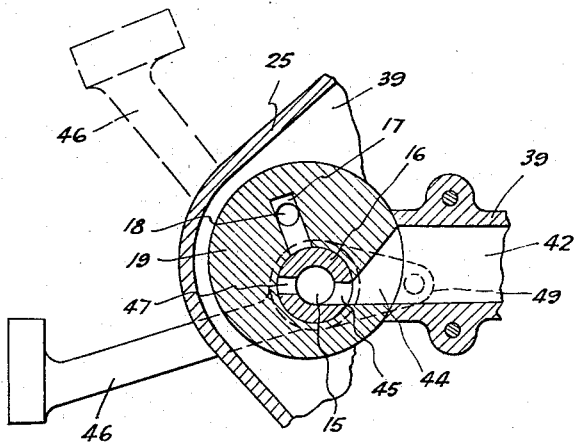
Figure 5:
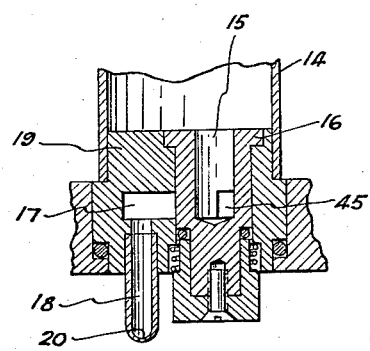
FIG. 5 is a fragmentary sectional elevation taken on line 5—5 in FIG. 3.

It will be seen that provided the bore 15 is opened to a source of liquid to be dispensed, and also provided that the branch duct 17 is closed off as shown in FIGS. 4 and 5 (by the valve plug 16) upward movement of either of the pistons 21 or 26 will cause a certain quantity of liquid to be induced into the cylinder 14. The amount of the induced liquid will, of course, depend upon the amount of piston movement and whether one piston is moved relative to the other. If the two pistons are moved as one, the amount of liquid induced will be directly proportional to the amount of piston travel and will be a relatively large amount per unit of length of travel distance owing to the comparatively large diameter of the main piston. On the other hand, if the fractional piston is raised by itself, or by some amount over and beyond the movement of the main piston, then the amount of liquid induced by the smaller piston will be some relatively small fractional amount.

In the measuring of paint quantities (for which the embodiment under description is primarily intended) suitable diameters for the two pistons are such as will give the fractional piston a facial area which is one sixteenth that of the main piston. In such case, if a full stroke of the main piston is such as will cause it to induce 4 fl. oz. into the cylinder in sixteen steps each equal to ¼ fl. oz. then an equal movement step of the fractional piston (relative to the main piston) will cause it to induce ¹⁄₆₄ fl. oz.

The container 25 is preferably furnished with stirring devices in case the liquid to be dispensed contains ingredients liable to segregate. The illustrated stirring devices consist in a tubular shaft 29 rotatable in a footstep bearing 30 and a top bearing 31 on a lid 32 for the filler opening of the container. The shaft carries elevator paddles 33 and at top has a clutch ferrule 34 fixed thereon. The top face of the ferrule has radial slots in it to accommodate the arms 35 of a driving plate 36.

The plate 36 has a rectangular hole in it through which a helical driver strip 37 extends. The upper end of the driver strip is fixed to a handpiece 38. When the handpiece 38 is raised, the plate 36 will rise with it sufficiently to declutch from the ferrule 34; but when the handle 38 is pushed down, the plate 36 drivingly engages with the ferrule 34 so that the shaft 29 is rotated unidirectionally.

Figure 3:
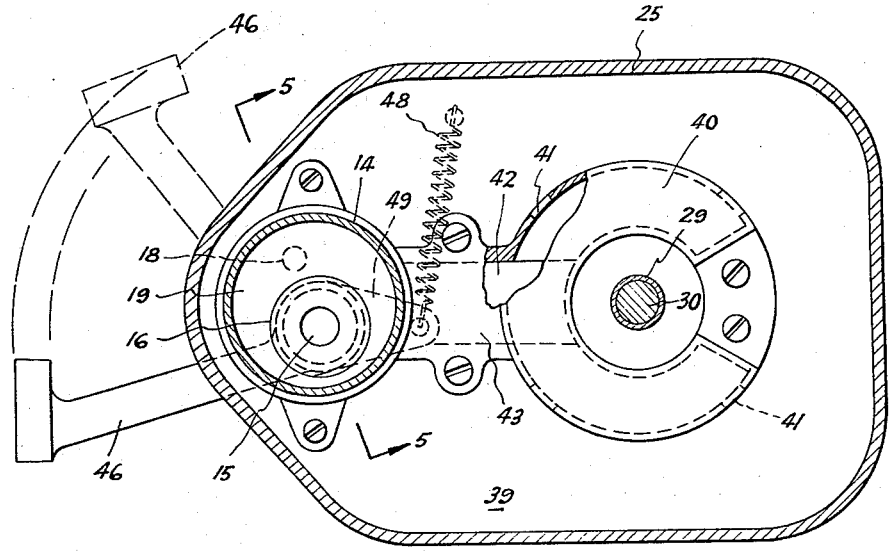

The floor 39, of the container 25, has an outlet dome 40 fixed thereto, and this dome has liquid outlet ports 41 which lead to a duct consisting of a portion 42 formed partly by the floor 39 and partly by a sideward extension 43 of the dome 40, and a portion 44 formed in the cap 19. The duct registers with a side port 45 in the valve plug 16 when that plug is in one of its two working positions. A handle 46 is fixed to the plug 16, and the two working positions of the plug are respectively indicated by the full line and dotted line positions of the handle as shown in FIGS. 3 and 4. Suitable stops (not shown) are provided to ensure that the plug 16 is not movable beyond the angular span between its two working positions. In one of those two positions the port 45 registers with the duct 44–42 (as previously explained) thus putting the interior of the cylinder 14 in direct communication with the interior of the container 25, and at the same time closing a second side port 47 formed in the valve plug 16. In the other position of plug 16, port 45 is closed, and the port 47 registers with the branch duct 17, thus putting the outlet nozzle 18 in direct communication with the interior of the cylinder 14. The valve plug 16 is preferably biased to remain in its working position as shown in FIGS. 1 to 5, by means, for example, of a tension spring 48 connected to a tail-piece 49 on handle 46.

It will be seen that with the apparatus thus far described liquid dispensing could be effectively performed by stocking the container 25 with the liquid, then lifting the guided piston rods by whatever measured amount may be equivalent to the required volumetric induction of liquid into the cylinder 14. The handle 46 would then be moved to its other working position and held there while the pistons are moved downwardly so to expel the induced liquid through the nozzle 18. It is preferred, however, that the apparatus include means for preselection of piston elevation in terms of volumetric induction corresponding to such elevation.

Accordingly, the preferred preselection means (still referring to FIGS. 1 to 5) comprise a handle 50 on the boss 28 to which the upper end of the tubular piston rod 22 is fixed, a second boss 51 (furnished with handle 52) to which the upper end of the fractional piston rod 27 is fixed, and a stop which may be adjusted to set a selectively variable limit to the extent by which the bosses 28 and 51 may be moved away from the cylinder 14.

The mentioned stop is constituted by a head or stop 53 fixed on one end of an index rod 54. This rod is slidable through both bosses 51 and 28 and also through the cover 24, and it is provided with means for holding it in selected endwise adjustment relative to the cover 24. These means may consist in no more than a set screw which threads in the cover so that it may be tightened against the rod 54. For preference however, the rod is provided with a series of index holes 55 into any one of which an index pin 56 may be entered. Pin 56 is loaded by compression spring 57 and may be withdrawn from a hole 55 by use of handle 58. The spacing of the holes 55 is such that movement of one of the pistons 21 or 26 by an amount equal to that spacing will result in some selected standard volume of liquid being induced into the cylinder 14.

In the colour blending of paints it is found that a minimum increment of liquid is usually 1/64 fl. oz. and therefore a convenient spacing of the holes 55 is such that movement of the fractional piston 26 (by itself) through a distance equal to one pitch of the holes 55 will suffice for induction into the cylinder 14 of 1/64 fl. oz. and a similar movement of both the main and fractional pistons will then suffice for induction of 1/4 fl. oz., assuming the main and fractional pistons are so sized that the larger is sixteen times greater in area than the smaller.

By reference to FIG. 1 it will be seen that the handle 50 has a finger knob 59 associated with it. This finger knob is mounted on a push rod 60 which is slidable in handle 50 against opposition due to compression spring 61. The push rod has yoke arms 62 thereon which pass to either side of the boss 28, through elongated holes in the sides of handle 50, to a latch member 63 able to engage in a depression 64 formed in an upstanding portion 65 of the cover 24. The purpose of this latch arrangement is to ensure against unwanted upward movement of boss 28 and hence of the main piston 21. If a user requires to lift the boss 28, the finger knob 59 is depressed so to release the latch 63.

The index rod 54 is preferably graduated with two scales, one related to the fractional piston, being in terms (say) of 64ths of a fluid ounce, and the other being in terms of the main piston, having (say) 1/4 fl. oz. divisions. These scales may be arranged to be read from any selected elevation level for example, from the topmost level 65 of the boss 51.

When a certain quantity of liquid is to be dispensed, the index pin 56 is withdrawn from the indexing rod 54 and by use of the stop 53 as a handle the index rod is raised by the required amount as indicated by the scales on the rod. The index pin is then reinserted in the appropriate hole of the index rod and if the liquid to be dispensed is a fractional one only the handle 52 is raised so that induction into the cylinder 14 is then entirely due to the fractional piston 26. In this action the handle 52 is raised until it abuts the stop 53. Alternatively, the latch 63 may be released and both handles 50 and 52 raised as one until the boss 51 again abuts the stop 53 in the event of the dispensation being one involving the main piston 21. When induction is complete, the handle 46 is operated so to close off the duct 44 and bring the nozzle 20 into direct communication with the interior of cylinder 14. The hand piece 52 is then lowered so to expel the induced charge through the nozzle 20.

In the embodiment shown in FIGS. 6 to 9, the main measuring cylinder 66 is entirely separate from the liquid container 67, but is adapted to be hermetically coupled thereto for the purpose of receiving a measured charge of liquid therefrom.

The cylinder 66 is provided with an end cap 68 and houses a main piston 69 fixed on tubular piston rod 70. Rod 70, in turn, contains fractional piston 71 on rod 72. So far as these piston and piston rod arrangements are concerned they may be substantially the same as those already described with reference to the earlier figures of the drawings; however, indexing arrangements of the kind already described, are included in the embodiment now under description.

The cap 68 has an end flange 73 furnished with a sealing gasket 74; and the container has a discharge opening 75 which is normally closed by a sealing disc 76. This sealing disc is mounted in a valve plate 77 which is slidable within a race 78, being held therein by retainer flanges 79. The plate 77 has a hole 80 in it able to accommodate the flange 73.

Figure 6:
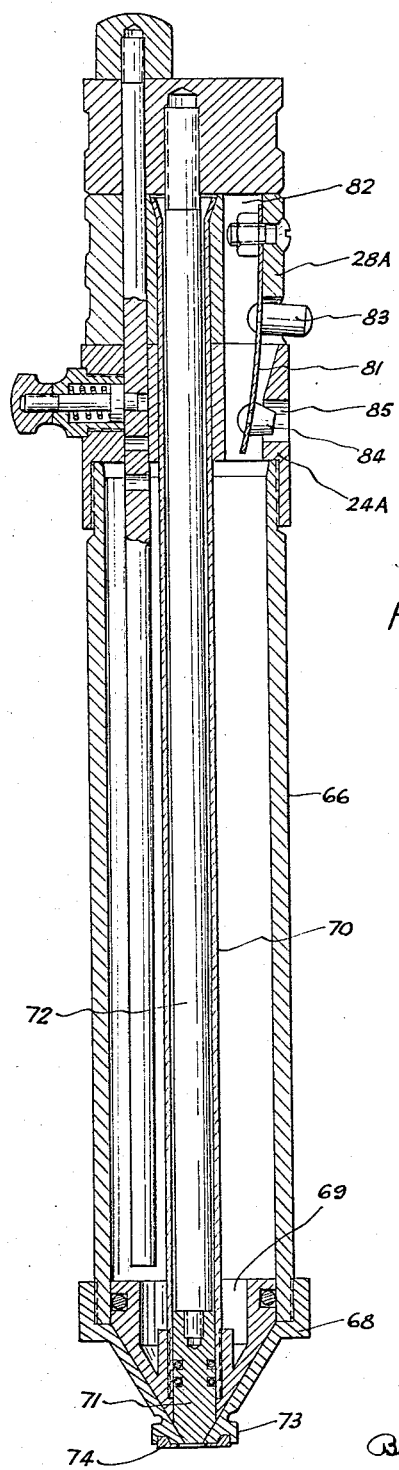
FIG. 6 is a sectional side elevation of another embodiment of the invention.

When a charge of liquid is to be induced into the main measuring cylinder 66, the pistons 69 and 71 are both brought to zero position as shown in FIG. 6. The flange 73 is then placed in the hole 80 and the cylinder 66 and the valve plate 77 are lowered so to bring the opening in flange 73 into register with container outlet 75. In this position, the retainer flanges 79 engage behind the flange 73 thus to maintain close connection during induction of liquid into cylinder 66 by retraction of one or both of the pistons 69 and 71.

It will be appreciated that the arrangement (of measuring cylinder, main piston, fractional piston and parts directly related thereto) shown in FIG. 6 could, of itself, be quite usefully applied to the purposes of the invention simply by dipping the flange 73 end of the cap 68 into a body of liquid and then making the necessary piston movements for induction of a required charge of liquid into the measuring cylinder. It is preferred however, that the matters of FIGS. 7 to 9 be used in combination with the arrangement shown in FIG. 6 as otherwise inaccuracy of measurement may arise due to liquid dripping from portion of the cap 68 following immersion of the flange end thereof; or a careless operator may not keep the end of cap 68 immersed while charging the measuring cylinder.

In the form of the apparatus shown in FIG. 6 the means for releasably holding the first boss 28A stationary in relation to cylinder cover 24A are slightly different from the corresponding means as shown in FIG. 1 (by numbers 59 to 65) in consisting of a leaf spring 81 fixed by one end inside a cavity 82 provided in the first boss 28A. The spring carries a finger press-button 83 and a latch plunger 84 able to home in hole 85 in the cover 24A.

Figure 10:
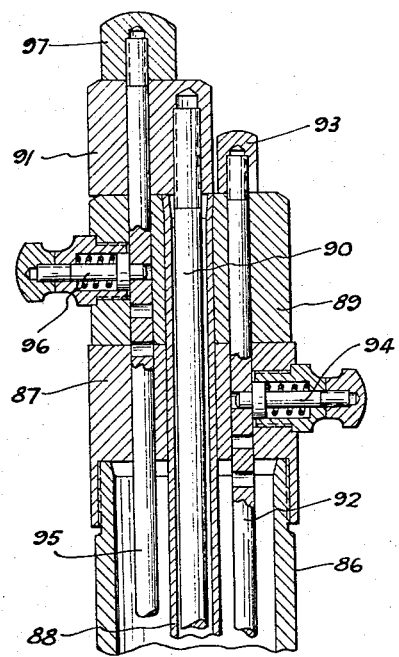

The embodiment shown in FIG. 10 is much the same as those already described except for its provision of two index rods; one for the main piston and one for the fractional piston. The showing of FIG. 10 can be regarded as effectively able to be substituted for the upper half portion of FIG. 6 or the upper left-hand corner portion of FIG. 1.

Referring to FIG. 10 the main cylinder 86 has a cover 87 on that end of it remote from its liquid outlet. The main piston rod 88 is tubular thereby to constitute a fractional cylinder which accommodates a fractional piston as in the previously described embodiments. The rod 88 is fixed to a first boss 89 which is able to abut the outer face of the cover 87. The fractional piston rod 90 is fixed to a second boss 91 which is able to abut the outer face of the first boss 89.

A first index rod 92 is slidable through cover 87 and first boss 89, and carries a stop 93 able to abut the outer face of boss 89. Rod 92 is virtually the same as that marked 54 in FIG. 1 or that shown in FIG. 6. In further similarity it is furnished with a spring-loaded withdrawable index pin 94 whereby it may be held in selected adjustment relative to the cover 87.

A second index rod 95 is similar to rod 92 and is similarly furnished with a spring-loaded withdrawable index pin 96 whereby the second rod 95 may be held in selected adjustment relative to the first boss 89. Rod 95 is slidable through the cover 87 and both bosses 89 and 91. It has an end stop 97 able to abut the outer face of the second boss 91.

Still referring to FIG. 10; if a liquid dispensing task is to be effected only by use of the main measuring cylinder and the large piston in it, the pin 96 is allowed to remain locked (as shown). Index rod 92 is extended by the required amount and set in selected adjustment by pin 94. The entire assembly, consisting of parts 89, 90, 91, 96 and 97, is then moved outwardly as a one-piece element until halted by abutment of first boss 89 against the stop 93. This action will induce the required charge into the main cylinder, and this charge can be expelled from the main cylinder simply by reverting the mentioned assembly to zero position as shown in FIG. 10.

Where the fractional cylinder is to be used by itself, pin 94 is left locked in zero position as shown. The index rod 95 is extended by the required amount and is set in selected extension by its pin 96. The second boss 91 is then moved outwardly until halted by the stop 97. Reversion of the moved parts to zero position will then expel the induced fractional charge.

Where a liquid amount consisting of a "main volume" and a "fractional volume" is to be dispensed, both index rods are extended in the same way as just described for each. This will induce the required charge into the main cylinder and the fractional cylinder. Again, simple reversion of the moved parts to zero position (as shown) will expel the induced charge in (if desired), a single expulsion stroke action.

Although the invention has been described herein in terms of dispensing devices employing only a main cylinder and a single fractional cylinder, it will be clear more than two cylinders could be employed. For example, where very accurate liquid dispensing is required, a third or "sub-fractional" cylinder could be embodied simply by making the piston rod 90 (FIG. 10) tubular and fitting it with a sub-fractional piston on a piston rod which extends through and outwardly beyond the outer face of the second boss 91. Such a sub-fractional arrangement could be provided with index rod devices similar to those already described or the piston rod itself could be furnished with index holes engageable by a spring-loaded withdrawable index pin (similar to those marked 94 or 96) mounted on the second boss, so that the sub-fractional piston rod could be held in selected adjustment relative to the second boss. In such an arrangement the sub-fractional piston rod would preferably be of square or other non-circular cross-sectional shape so that it would be non-rotatable and thus prevent its index holes getting out of alignment relative to its index pin. As a further alternative, a sub-fractional piston rod as just referred to could simply carry a scale of volume graduation which could be sighted against the upper face of the second boss 91.

It will be understood that in most color blending operations it will be desirable to provide a plurality of measuring units which may be mounted upon a bench or upon a rotary table or the like by which the units are successively brought into a dispensing station. Moreover, in any such multiple assembly of traveling units the piston rods may be arranged as followers to a suitable cam track by which the necessary piston movements may be effected; and again, the stirrers for the liquid containers may be power operated instead of manually as previously herein described.

I claim:

1. Liquid dispensing apparatus comprising: a main measuring cylinder having a cover at one end and a liquid outlet at the other end, a main piston slidable in said main cylinder; a main piston rod whereon said main piston is mounted, which extends externally of and is slidable through said cover, and which is tubular thereby to consistute a fractional measuring cylinder; a first boss on the outer end of said main piston rod able to abut the outer face of said cover, a fractional piston slidable in said main piston rod, a fractional piston rod whereon said fractional piston is mounted and which extends externally of and is slidable through said first boss, a second boss on the outer end of said fractional piston rod able to abut the outer face of said first boss, an index rod which is slidable through said cover and both of said bosses and which extends externally of said second boss, a stop on the outer end of said index rod able to abut the outer face of said second boss, and means for holding said index rod in selected adjustment relative to said cover.

2. Apparatus according to claim 1 wherein the means for holding said index rod comprises a series of holes in said index rod and a spring-loaded withdrawable index pin mounted on said cover and able to enter any one of said holes.

3. Apparatus according to claim 1 including means for holding said first boss in abutment with said cover, comprising a push rod mounted on said first boss and movable laterally thereof, a spring on said push rod which opposes inward movement thereof, an upstanding portion on said first boss having a depression therein, and a yoke fixed on said push rod having a portion able to home in said depression.

4. Apparatus according to claim 1 including means for holding said first boss in abutment with said cover, comprising a leaf spring fixed by one end inside a cavity in said first boss, a finger press-button on said leaf spring, and a latch plunger on said leaf spring able to home in a hole in said cover.

5. Liquid dispensing apparatus comprising a container for liquid to be dispensed having a discharge opening therein, a main measuring cylinder having a cover at one end and a liquid outlet at the other end, a main piston slidable in said main cylinder; a main piston rod whereon said main piston is mounted, which extends externally of and is slidable through said cover, and which is tubular thereby to constitute a fractional measuring cylinder; a first boss on the outer end of said main piston rod able to abut the outer face of said cover, a fractional piston slidable in said fractional measuring cylinder, a fractional piston rod whereon said fractional piston is mounted and which extends externally of and is slidable through said first boss, a second boss on the outer end of said fractional piston rod able to abut the outer face of said first boss, an index rod which is slidable through said cover and both of said bosses and which extends externally of said second boss, a stop on the outer end of said index rod able to abut the outer face of said second boss, means for holding said index rod in selected adjustment relative to said cover, and valve devices for charging said cylinders with liquid from said container by way of said discharge opening.

6. Apparatus according to claim 5 including duct means connecting the outlet end of said main cylinder to the bottom of said container, and wherein said valve devices permit liquid to enter said cylinders only by way of said duct means and to leave said cylinders only by way of said outlet.

7. Apparatus according to claim 6 wherein said valve devices comprise a cap which closes the outlet end of said cylinder and has said outlet formed therein, a rotary valve plug in said cap, and means for part rotating said plug.

8. Apparatus according to claim 7 wherein the means for part rotating said plug comprise a handle fixed on said plug, a tail-piece on said handle, and a return spring connected to said tail-piece.

9. Apparatus according to claim 5 wherein said valve devices comprise a gasketed end flange surrounding said cylinder outlet, a sealing disc able to close said container discharge opening, a valve plate slidable across said opening and having a hole therein able to receive said gasketed end flange, and retainer flanges able to hold said valve plate in the plane of said opening and to engage behind said gasketed end flange.

10. Liquid dispensing apparatus comprising: a main measuring cylinder having a cover at one end and a liquid outlet at the other end, a main piston slidable in said main cylinder; a main piston rod whereon said main piston is mounted, which extends externally of and is slidable through said cover, and which is tubular thereby to constitute a fractional measuring cylinder; a first boss on the outer end of said main piston rod able to abut the outer face of said cover, a fractional piston slidable in said main piston rod, a fractional piston rod whereon said fractional piston is mounted and which extends externally of and is slidable through said first boss, a second boss on the outer end of said fractional piston rod able to abut the outer face of said first boss, a first index rod which is slidable through said cover and said first boss and which extends externally of said first boss, a stop on the outer end of said first index rod able to abut the outer face of said first boss, a second index rod which is slidable through said cover and both of said bosses, a stop on the outer end of said second index rod able to abut the outer face of said second boss, means for holding said first index rod in selected adjustment relative to said cover, and means for holding said second index rod in selected adjustment relative to said first boss.

11. Apparatus according to claim 10 wherein the means for holding said first index rod comprise a series of holes in said first index rod and a spring-loaded withdrawable index pin mounted on said cover and able to enter any one of the holes in said first index rod; and wherein the means for holding said second index rod comprise a series of holes in said second index rod and a spring-loaded withdrawable index pin mounted on said first boss and able to enter any one of the holes in said second index rod.

12. Liquid dispensing apparatus comprising a container for liquid to be dispensed having a discharge opening therein, a measuring cylinder having an outlet cap at one end whereof the internal sidewall converges to an outlet hole, a piston in said cylinder whereof the face confronting said outlet hole is convergent and able to seat closely against said sidewall, a piston rod upon one end of which said piston is fixed and whereof the other end guidedly extends through and beyond the other end of said cylinder, a gasketed end flange surrounding said outlet hole, a sealing disc able to close said container discharge opening externally of said container, a valve plate whereon said sealing disc is mounted and which is slidable across said container discharge opening and having a hole therein able to receive said gasketed end flange, and retainer flanges able to hold said valve plate in the plane of said opening and to engage behind said gasketed end flange.

References Cited by the Examiner

UNITED STATES PATENTS

| | | | |
|---|---|---|---|
| 1,781,604 | 11/1930 | Seguin | 222—260 |
| 2,079,744 | 5/1937 | Maguire | 222—387 X |
| 2,320,780 | 6/1943 | Jennings et al. | 141—386 X |
| 3,052,376 | 9/1962 | Fogg | 222—43 |
| 3,119,524 | 1/1964 | King et al. | 141—26 X |
| 3,134,407 | 5/1964 | Wegman | 141—18 |

LAVERNE D. GEIGER, *Primary Examiner.*

E. EARLS, *Assistant Examiner.*